United States Patent [19]

Debru

[11] Patent Number: 4,477,410

[45] Date of Patent: Oct. 16, 1984

[54] DEVICE FOR COOLING THE MAIN VESSEL OF A FAST FISSION NUCLEAR REACTOR

[75] Inventor: Michel Debru, Massy, France

[73] Assignee: Novatome, Le Plessis Robinson, France

[21] Appl. No.: 362,823

[22] Filed: Mar. 29, 1982

[30] Foreign Application Priority Data

Apr. 30, 1981 [FR] France ............................ 81 08638

[51] Int. Cl.$^3$ ............................................ G21C 15/00
[52] U.S. Cl. ...................................... 376/404; 376/290
[58] Field of Search ................. 376/404, 290, 291, 405

[56] References Cited

U.S. PATENT DOCUMENTS 3,962,032 6/1976 Berniolles et al. .................. 376/405
4,249,995 2/1981 Jogand .................................. 376/290

Primary Examiner—Harvey E. Behrend
Attorney, Agent, or Firm—Pollock, Vande Sande & Priddy

[57] ABSTRACT

The annular space (19) delimited by the main vessel (3) and an internal shell (16) is in communication with the zone (15) of the reactor vessel, in which the cold primary liquid is located. The annular space (20) delimited by the shell (16) and by an internal shell (17) is in communication with the lower part of the core (7) via tubes (31). Thus, the cold primary liquid is injected into the space (20), where it circulates from bottom to top, and flows into the space (19), where it circulates from top to bottom while at the same time cooling the main vessel (3).

The invention applies, in particular, to fast fission nuclear reactors cooled by liquid sodium.

3 Claims, 3 Drawing Figures

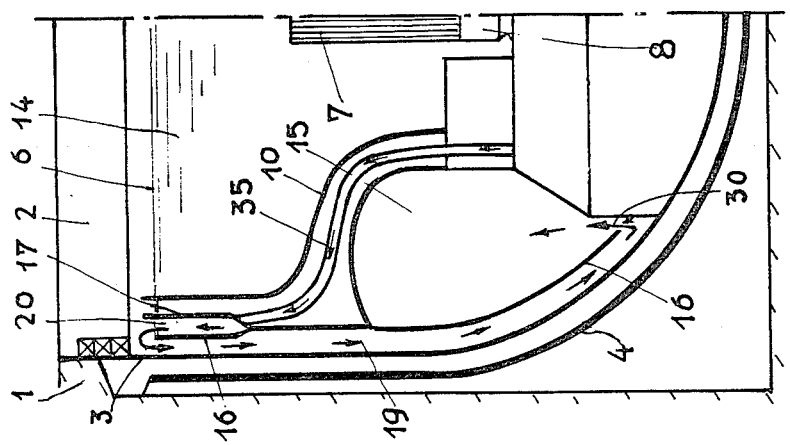
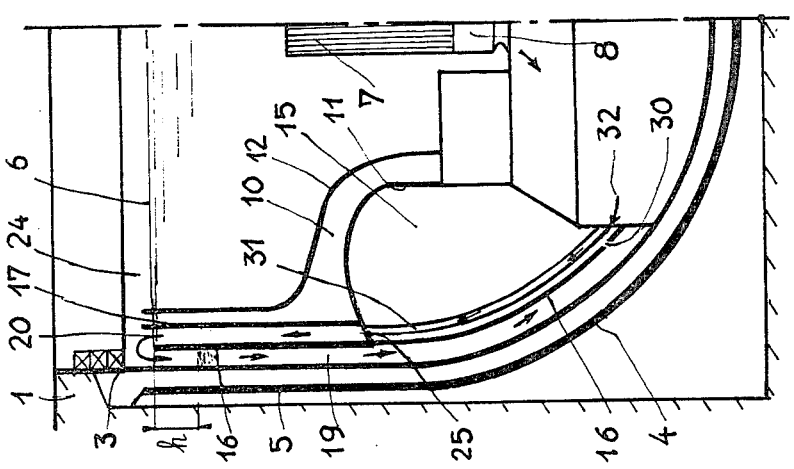

DEVICE FOR COOLING THE MAIN VESSEL OF A FAST FISSION NUCLEAR REACTOR

FIELD OF THE INVENTION

The invention relates to a device for cooling the main vessel of an integrated-type fast fission nuclear reactor comprising a vessel with a symmetry of revolution about a vertical axis, referred to as the "main vessel".

BACKGROUND OF THE INVENTION

In this type of reactor, the main vessel contains a cooling liquid in which the reactor core is immersed, the core consisting of juxtaposed fuel arrays and releasing heat produced by fission, the heat being transferred to the cooling liquid filling the vessel, which is generally liquid sodium.

The vessel is closed at its upper part by a thick slab, which is itself supported by the protective concrete wall of the reactor. The main vessel is generally fixed to the slab, whereby the assembly comprising the vessel, the components and the sodium which it contains is suspended from the slab via the upper part of the vessel, which is thus subjected to large strains.

It is therefore necessary to prevent the main vessel, in contact with the liquid sodium, from being raised to a high temperature or from undergoing temperature variations, during the operation of the reactor.

Furthermore, a partition with a symmetry of revolution, which is generally a double partition, separates the interior volume of the main vessel into two zones, one of which contains the reactor core. In this zone, the liquid sodium passing through the core from bottom to top leaves the core at a temperature of the order of 560° C., whereas the sodium enters the core, in the lower part of the latter, at a temperature of the order of 400° C.

For this reason, the sodium leaving the core and filling the first zone of the main vessel is referred to as "hot sodium", whereas the sodium entering the reactor core is called "cold sodium".

A series of heat exchangers referred to as "intermediate exchangers" are furthermore arranged inside the main vessel, so that the inlet for primary fluid in these exchangers is located inside the first zone containing the hot sodium, and so that the outlet for primary fluid emerges in the second zone created in the main vessel by the separating partition. Inside the intermediate exchanger, the sodium filling the vessel, referred to as "primary sodium", heats sodium referred to as "secondary sodium", which is sent to steam generators in which it causes the vaporization of the feed water. The primary sodium coming from the first zone has cooled by heating the secondary sodium, whereby the second zone of the main vessel receives cold sodium, which is sent from this zone, by virtue of a series of pumps immersed in the vessel, to the lower part of the reactor core, under the arrays, by virtue of the outlet pipes of the pumps, which are in communication with this part of the core.

To provide the cooling and keep the main vessel at a constant temperature, cold sodium is furthermore circulated in contact with the internal surface of the latter, at least in its upper part. To do this, at least two cylindrical shells are arranged inside the vessel and coaxially thereto.

The shell of larger diameter, or external shell, creates an annular space between its external surface and the internal surface of the main vessel, and this space is brought into communication with the lower part of the core, i.e., the zone into which the cold sodium is injected.

The two shells create between one another a second annular space, which is brought into communication with the second zone created in the vessel containing the cold sodium. These two annular spaces emerge, in their upper part, in a zone between the slab and the upper level of sodium in the vessel, which is filled with a blanket of inert gas protecting the slab.

Part of the cold sodium injected by the pumps is sent into the external annular passage and circulates therein, from bottom to top, in contact with the internal surface of the main vessel, which it cools and keeps at the temperature of the cold sodium. In the upper part of the external space, the sodium flows into the second annular space and moves down again, by gravity, into the second zone of the vessel, containing the cold sodium.

Various improvements to this device for cooling by the circulation of cold sodium have been envisaged, but, in all cases, the external shell is subjected to the pressure of the liquid sodium on its external surface, in its upper part where this pressure is not equilibrated by the pressure of the sodium contained in the second annular space, because of the difference in sodium level between these two spaces, making it possible for the sodium to flow from one space to the other.

In the same way, the lower part of the shell is subjected to a differential pressure due to the difference in height of the sodium columns in the two annular spaces.

It is therefore necessary to provide shells which are strong and hence of large thickness. The weight of the assembly supported by the main vessel is thereby increased accordingly.

SUMMARY OF THE INVENTION

The object of the invention is therefore to propose a device for cooling the main vessel of an integrated-type fast fission nuclear reactor comprising a vessel with a symmetry of revolution about a vertical axis, referred to as the "main vessel", which contains a cooling liquid and inside which are arranged the reactor core, a plurality of pumps for circulating the cooling liquid, and a plurality of heat exchangers using the cooling liquid as the primary fluid, a partition, with a symmetry of revolution about the axis of the vessel, arranged at a certain height in the vessel and at the periphery of the core, creating, in this vessel, two separate zones, one of which contains the core and the sodium heated in contact with this core, which leaves this first zone through the inlet for primary fluid in the heat exchangers, in which the outlet for primary fluid is located in the second zone, containing the liquid cooled by the heat exchangers, which is carried away by the pumps and injected into the lower part of the core, and at least two shells, which are coaxial relative to the main vessel and are arranged inside the latter over a certain height, above the partition, creating between them, and between the shell of larger diameter, or external shell, and the vessel, at least two annular spaces for the passage of the cooling liquid, one of which emerges in the lower part of the core and the other in the second zone, these two annular spaces furthermore being in communication, in their upper part, with a zone located in the upper part of the vessel and filled with inert blanketing gas, this cooling device being intended to make it possible to use shells of lower mechanical strength and hence of smaller thickness for delimiting the spaces for the circulation of the cold sodium, and thus to lead to a weight saving over all the components arranged inside the vessel.

For this purpose, the annular space delimited by the main vessel and the external shell, or external space, is in communication with the second zone containing the cooled liquid, and the internal space delimited between the two shells is in communication, via at least one tube, with the lower part of the core, into which the cold liquid is injected, part of which is thus caused to circulate from bottom to top in the second space before flowing into the external space, at the level of the upper zone of the vessel occupied by the blanket of gas, and moving down again, by gravity, to the lower part of the core, remaining in contact with the internal surface of the main vessel and thus providing the cooling of this vessel.

Two embodiments of a cooling device according to the invention will now be described, by way of non-limiting examples and with reference to the attached figures, by comparison with a cooling device according to the prior art.

BRIEF DESCRIPTION OF THE DRAWINGS

FIG. 2 shows a half-view in section, through a vertical plane of symmetry, of a fast fission nuclear reactor vessel comprising a device for cooling the main vessel, according to a first embodiment of the invention.

FIG. 3 shows, in a half-view in section through a plane of symmetry, a fast fission nuclear reactor vessel equipped with a device for cooling the main vessel, according to a second embodiment of the invention.

DETAILED DESCRIPTION

Figure 1:
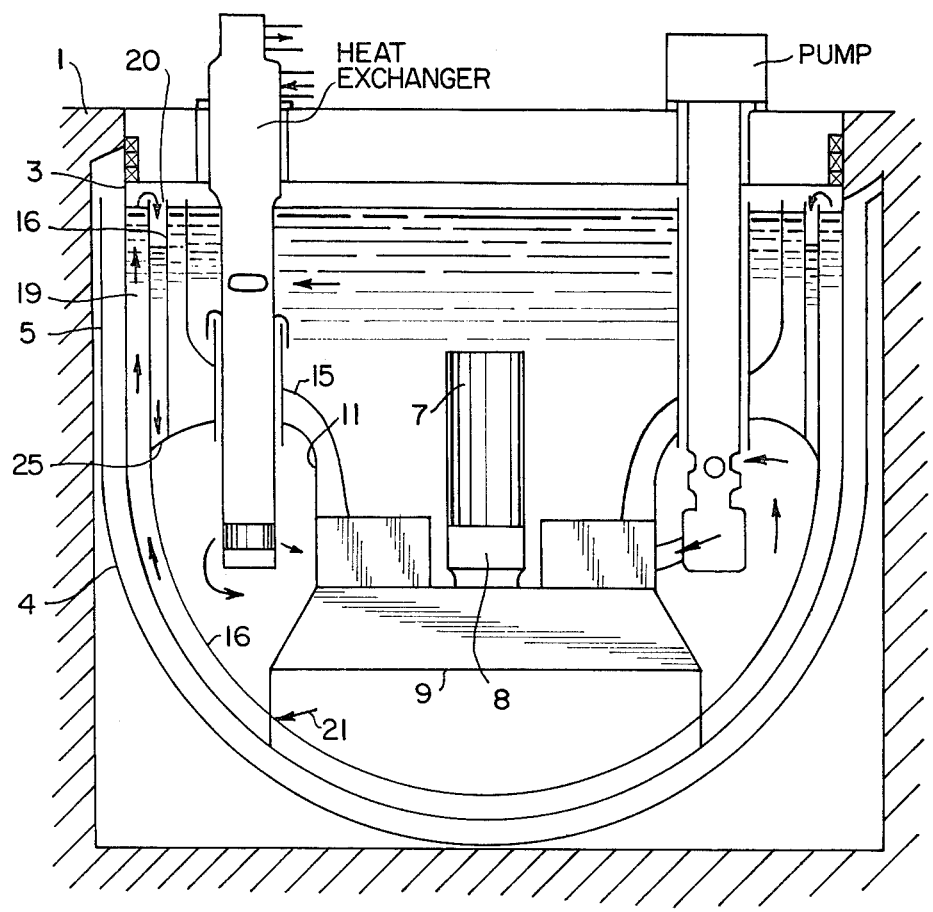
FIG. 1 shows, in a half-view in section through a vertical plane of symmetry, the vessel of an integrated-type fast fission nuclear reactor, comprising a cooling device according to the prior art.

FIG. 1 shows the protective wall 1 of a fast fission nuclear reactor, to which the slab 2 covering the reactor vessel is fixed.

The main vessel 3 is fixed to the slab in its upper part, while the safety vessel 4, covered with a layer of insulating material 5, is fixed to the protective wall 1.

Up to the level 6, the main vessel 3 contains liquid sodium, in which the reactor core 7 is immersed, which rests on a bed 8 and a floor 9, itself resting on the bottom of the main vessel 3. The interior volume of the main vessel 3 is separated into two different zones by a double partition 10, which is supported by the floor 9 at the periphery of the core and consists of an annular wall 11 and a cylindro-conical wall 12. This double partition, also referred to as a step, makes it possible to isolate the sodium contained in the upper zone 14, containing the core 7, from the sodium contained in the annular lower zone 15.

Intermediate heat exchangers and pumps, not shown, make it possible firstly to cool the hot sodium contained in the zone 14 in contact with the secondary sodium, to transfer this sodium from the zone 14 to the zone 15, and finally to inject the cold sodium removed from the zone 15, into the lower part of the core, in the bed 8.

The cold sodium re-injected into the base of the core passes through the latter from bottom to top, heats up and then passes from the zone 14 to the zone 15 via the intermediate exchangers.

In addition to the step, an external shell 16 and an internal shell 17 are arranged in the vessel and coaxially thereto, and those parts of these shells which are located above the zone 15 delimit between one another, and between the outer shell and the main vessel 3, two annular spaces 19 and 20, in which the cold sodium circulates.

To permit this circulation of cold sodium, the shell 16 is extended so as to bring the space 19 into communication with the base of the core, under the bed 8, at the point where the cold sodium is injected.

As shown by the arrows 21, a circulation of cold sodium is set up from bottom to top in the annular space 19 created between the external shell 16 and the main vessel 3.

In the top part of the annular passage 19, which emerges, under the slab 2, in the space 24 created between the slab and the liquid sodium level 6 and filled with an inert gas, for example argon, the cold liquid sodium flows along the shell 16, inside the annular space 20, this sodium moving down again, by gravity, into the part 15 of the vessel, containing the cold sodium.

The annular passage 20 is brought into communication with the zone 15 containing the cold sodium, via a calibrated orifice 25, making it possible to adjust the pressure drop during the circulation of the sodium.

The circulation of the cold sodium in contact with the internal wall of the main vessel 3 makes it possible to cool the latter and to keep it at a temperature which is virtually constant and corresponds to the temperature of the sodium before it enters the core.

The pumping of the liquid sodium and the pressure drop during its circulation make it possible to maintain a difference in level between the sodium filling the tube 19 and the sodium flowing into the tube 20.

FIG. 2 shows the elements corresponding to those shown in FIG. 1, provided with the same reference numbers.

In contrast to the embodiment of the cooling device shown in FIG. 1 and corresponding to the prior art, the annular space 19 is brought into communication by a series of calibrated openings 30, making it possible to ensure an adjusted pressure drop during the circulation of the sodium, with the annular zone 15 containing the cold sodium, whereas the annular space 20 is brought into communication, via tubes 31, with the zone of the vessel located underneath the bed 8, into which the cold sodium is injected.

In this way, the cold sodium circulates in the direction indicated by the arrows 32. The cold sodium therefore circulates first inside the tubes 31, through which it reaches the annular space 20, through which it passes from bottom to top up to the level of the space between the slab and the liquid sodium level 6, where the upper end of the outer shell 16 is located.

The cold sodium then flows, by gravity, into the annular space 19, along the external surface of the shell 16.

A difference in sodium level in the annular spaces 20 and 19, respectively, is maintained, as previously, by virtue of pumping and by the pressure drop, in particular at the level of the openings 30.

In the external annular space 19, the sodium flows downwards, by gravity, in contact with the internal surface of the main vessel 3, which it cools and keeps at the temperature of the cold sodium, i.e., at about 400° C. The cold sodium returns to the zone 15 via the calibrated openings 30.

It is seen that, compared with the device according to the prior art, shown in FIG. 1, the device according to the invention has the advantage of placing the external shell 16 under internal pressure, whereas this shell is under external pressure in the device of the prior art. Likewise, the lower part of the baffle, which extends the shell 16 down to the level of the bed 8, is now subjected only to an internal differential pressure of low amplitude.

In this way, it is possible to reduce the thickness of the shell 16 and thus to make a substantial weight saving in the design of the reactor.

The difference in level h between the sodium filling the annular space and the sodium flowing in the annular space 19 is of the order of two meters for the nuclear reactors currently being constructed, the vessel of which has a diameter of the order of twenty meters.

The part of the main vessel 3 which is located over this height h, between the sodium level in the space 20 and the sodium level in the space 19, is not in contact with the sodium as in the case of the device of the prior art.

However, this does not give rise to large temperature differences between the points of the vessel which are in contact with this sodium and the points of the vessel which are in contact with the gas on top of the sodium, because, in the first place, the safety vessel 4 is lagged, which prevents heat looses from the main vessel, and, in the second place, the heat supplied by the radiation from the external shell 16, at the level of the zone of height h, keeps the main vessel, in this zone, at a temperature close to the temperature of the remainder of the vessel.

FIG. 3 shows a second embodiment of the cooling device according to the invention, in which the shell 17 is of reduced height and in which the space 20 is in communication, by its lower part, with the lower part of the core, via tubes, such as 35, passing through the central space in the partition 10, located between the two parts of the partition constituting the step.

As in the case of the device shown in FIG. 2, the annular space 19 communicates with the zone 15 containing the cold sodium, by means of calibrated orifices such as 30.

The operation of the device is virtually identical to the operation of the device shown in FIG. 2, a small part of the cold sodium injected under the bed 8 passing into the tube 35, and from there into the annular space 20 constituting a channel for the sodium flowing in the annular space 19, for the cooling of the main vessel 3 and and return of the sodium into the annular zone via the openings 30.

This device has the same advantages as the device shown in FIG. 2.

The invention is not limited to the embodiments which have been described; on the contrary, it includes all the variants thereof.

Thus, it is possible to envisage other means for connecting the annular space 20, constituting a channel for the liquid sodium, to the lower part of the core.

It is also possible to envisage any kind of connection between the space 19, created between the main vessel and the external shell, and the zone, such as 15, containing the cold sodium, for the recycling of the latter.

The device according to the invention can apply irrespective of the shape and structure of the step, whether the latter consists of a single partition or a double partition.

Finally, the device according to the invention applies in the case of all integrated-type fast fission reactors.

I claim:

1. A device for cooling the main vessel (3) of an integrated-type fast fission nuclear reactor comprising a vessel with a symmetry of revolution about a vertical aixs, referred to as the main vessel, which contains a cooling liquid and inside which are arranged the reactor core (7), a plurality of pumps for circulating the cooling liquid, and a plurality of heat exchangers using the cooling liquid as the primary fluid, a partition (10), with a symmetry of revolution about the axis of the vessel, arranged at a predetermined height in said vessel (3) and at the periphery of said core (7), creating in said vessel two separate zones, a first of said zones (14) containing said core (7) and the sodium heated in contact therewith, which leaves said first zone through an inlet for primary fluid in said heat exchangers, in which the outlet for primary fluid is located in the second of said zones (15), containing the liquid cooled by said heat exchangers, which is carried away by said pumps and injected into the lower part of said core, and at least two shells comprising outer and inner shells (16, 17) coaxial with said main vessel (3) and arranged inside the latter over a predetermined height above said partition (10), creating between them, and between the shell (16) of larger diameter, or external shell, and said vessel (3), at least two annular spaces (19, 20) for the passage of said cooling liquid, one of which emerges in the lower part of said core (7) and the other in said second zone (15), said two annular spaces furthermore being in communication, in their upper part, with a zone (24) located in the upper part of said vessel and filled with inert blanketing gas, in which cooling device the annular space (19) delimited by said main vessel (3) and said external shell (16), or external space, is in communication with said second zone (15) containing cooled liquid, and the internal space (20) delimited between the two shells (16, 17) is in communication, via at least one tube (31, 35), with the lower part of said core (7), into which said cold liquid is injected, part of which is thus caused to circulate from bottom to top in the second space (20) before flowing into the external space (19), at the level of the upper zone (24) of said vessel occupied by said blanket of gas, and moving down again, by gravity, to the lower part of said core, remaining in contact with the internal surface of said main vessel (3) and thus cooling the latter.

2. A cooling device as claimed in claim 1, wherein the tube or tubes (31) bringing said internal space (20), delimited by said two shells (16, 17), into communication with the lower part of said core (7) pass through the second zone (15) of said vessel, containing the cold liquid sodium.

3. A cooling device as claimed in claim 1, in the case where said partition (10), or step, separating the interior volume of said main vessel (3) into two parts consists of two walls (11, 12) having a free space between them, said at least one tube (35) bringing the internal annular space (20) between said two shells (16, 17) into communication with the lower part of said core (7) being arranged inside the free space created between the two parts of said step (10).

* * * * *